US010533665B2

(12) United States Patent
Kloetzer

(10) Patent No.: US 10,533,665 B2
(45) Date of Patent: Jan. 14, 2020

(54) SEAL ARRANGEMENT FOR TURBINE

(71) Applicant: MTU Aero Engines AG, Munich (DE)

(72) Inventor: Alexander Kloetzer, Fuerstenfeldbruck (DE)

(73) Assignee: MTU Aero Engines AG, Munich (DE)

( * ) Notice: Subject to any disclaimer, the term of this patent is extended or adjusted under 35 U.S.C. 154(b) by 295 days.

(21) Appl. No.: 15/453,672

(22) Filed: Mar. 8, 2017

(65) Prior Publication Data
US 2018/0223995 A1    Aug. 9, 2018

(30) Foreign Application Priority Data
Mar. 15, 2016 (DE) .................. 10 2016 204 213

(51) Int. Cl.
*F16J 15/3288* (2016.01)
*F01D 11/02* (2006.01)
*F02C 7/28* (2006.01)
*F16J 15/16* (2006.01)

(52) U.S. Cl.
CPC ......... *F16J 15/3288* (2013.01); *F01D 11/025* (2013.01); *F02C 7/28* (2013.01); *F16J 15/164* (2013.01); *F05D 2220/323* (2013.01); *F05D 2240/56* (2013.01); *F05D 2300/5021* (2013.01)

(58) Field of Classification Search
CPC ........ F16J 15/3288; F16J 15/164; F16J 15/00; F01D 11/025; F01D 11/00; F01D 11/001; F01D 11/18; F02C 7/28; F02C 7/00; F05D 2220/323; F05D 2240/56; F05D 2300/5021; F05D 2230/642; F05D 2250/232

USPC ......................................... 277/355
See application file for complete search history.

(56) References Cited

U.S. PATENT DOCUMENTS

| 5,944,320 | A | * | 8/1999 | Werner | ................. | F16J 15/3288 |
| | | | | | | 277/355 |
| 5,975,535 | A | * | 11/1999 | Gail | ..................... | F16J 15/3288 |
| | | | | | | 277/355 |
| 6,012,723 | A | * | 1/2000 | Beeck | .................. | F16J 15/3288 |
| | | | | | | 277/355 |
| 6,161,836 | A | * | 12/2000 | Zhou | .................... | F16J 15/3288 |
| | | | | | | 277/355 |
| 6,299,824 | B1 | * | 10/2001 | Mayr | ....................... | A46B 3/08 |
| | | | | | | 266/252 |

(Continued)

FOREIGN PATENT DOCUMENTS

| DE | 102004034374 A1 | 2/2005 |
| DE | 102011057159 A1 | 8/2012 |

(Continued)

*Primary Examiner* — Nathan Cumar
(74) *Attorney, Agent, or Firm* — Barlow, Josephs & Holmes, Ltd.

(57) ABSTRACT

The invention is directed to a seal arrangement, in particular a brush seal, for a turbine, in particular an aircraft gas turbine, with a sealing element and with a sealing surface that interacts with the sealing element, wherein the sealing element and the sealing surface are arranged concentrically with respect to each other, in particular concentrically around a machine axis of the turbine is hereby characterized in that the sealing element and the sealing surface are designed in such a way that, in a first operating state, a gap is formed between them, and in that, in a second operating state, a sealing contact is produced between the sealing element and the sealing surface.

9 Claims, 2 Drawing Sheets

(56) References Cited

U.S. PATENT DOCUMENTS

| | | | |
|---|---|---|---|
| 8,210,799 B1 | 7/2012 | Rawlings | |
| 8,690,534 B1 | 4/2014 | Janocko et al. | |
| 8,864,138 B2 * | 10/2014 | Dos Santos | F16J 15/3288 |
| | | | 277/355 |
| 9,121,297 B2 * | 9/2015 | Zheng | F01D 11/001 |
| 9,121,299 B2 | 9/2015 | Giametta | |
| 2009/0081028 A1 * | 3/2009 | Morgan | F01D 11/001 |
| | | | 415/174.4 |
| 2010/0007093 A1 * | 1/2010 | Grondahl | F16J 15/3292 |
| | | | 277/500 |
| 2011/0304101 A1 * | 12/2011 | Grondahl | F01D 11/02 |
| | | | 277/411 |
| 2013/0259640 A1 * | 10/2013 | Dimascio | F16K 31/002 |
| | | | 415/1 |
| 2013/0260169 A1 * | 10/2013 | Hefner | C23C 28/021 |
| | | | 428/603 |
| 2013/0277918 A1 * | 10/2013 | Fitzgerald | F01D 11/00 |
| | | | 277/355 |
| 2014/0361489 A1 * | 12/2014 | Giametta | F01D 11/08 |
| | | | 277/301 |

FOREIGN PATENT DOCUMENTS

| | | |
|---|---|---|
| EP | 2039887 A2 | 3/2009 |
| EP | 2339124 A1 | 6/2011 |
| EP | 2878863 A1 | 6/2015 |

\* cited by examiner

SEAL ARRANGEMENT FOR TURBINE

BACKGROUND OF THE INVENTION

The present invention relates to a seal arrangement, in particular a brush seal, for a turbine, in particular an aircraft gas turbine, with a sealing element and a sealing surface interacting with the sealing element, wherein the sealing element and the sealing surface are arranged concentrically with respect to each other, in particular concentrically around a machine axis of the turbine.

Hitherto known brush seals for turbines or turbomachines usually have radially arranged bristles and a horizontal (axis-parallel), cylindrical running surface (sealing surface) at a rotor. This makes it possible to compensate for axial movements with respect to one another and to compensate for small radial movements. Furthermore, brush seals in which the brush inner diameter prior to mounting is smaller than the outer diameter of the sealing surface are known. A pre-tensioning of the bristles in a mounted state of the brush seal results thereby; that is, the bristles are bent or curved on at least a part of their radial length due to the acting compressive forces. This has the drawback that the possible compensation of radial movements of the rotor is smaller. Furthermore, on account of the pre-tensioned bristles, there results a preferred direction of rotation of the rotor (operating rotational direction); that is, the pre-tensioned bristles are bent or inclined in the peripheral direction. A rotation of the rotor in the direction opposite to the operating direction is not allowed or is not possible, because the bristles of the seal, which are inclined in the operating direction of rotation, exert a blocking effect. If, nonetheless, the rotor is moved opposite to the operating direction of rotation, damage to the seal can result; in particular, parts of the brush seal can buckle, so that undesired gaps are formed between the bristles and the sealing effect is lost.

SUMMARY OF THE INVENTION

The object of the invention is to provide a seal arrangement that avoids the drawbacks mentioned.

In accordance with the invention, it is proposed for achieving this object that the sealing element and the sealing surface are designed in such a way that, in a first operating state, a gap is formed between them, and that, in a second operating state, a sealing contact between the sealing element and the sealing surface is produced.

As a result of the gap formed between the sealing element (brush seal) and the sealing surface or support surface in the first operating state, it is possible in the first operating state to twist the sealing element and the sealing surface in any direction of rotation relative to each other, without this entailing the risk of a detrimental effect on the sealing element. The first operating state can preferably be a standstill of the turbine. In this case, in this first operating state, the gas turbine or the seal arrangement can have a temperature that corresponds essentially to an ambient temperature. The second operating state is preferably a running state of the turbine, in which the turbine and the seal arrangement have an operating temperature that is several hundred degrees Celsius.

In an enhancement, it is proposed that, in relation to an axial lengthwise section, the sealing surface is designed to be inclined or bent with respect to the axial direction and with respect to the radial direction. In other words, the sealing surface preferably has a conical form; that is, its radius increases or decreases in the axial direction. As a result of the inclined or bent configuration, the interplay between the creation of a sealing contact and the provision of the gap between the sealing element and the sealing surface is simplified.

It is preferred that the sealing element has a contact portion that lies opposite to the sealing surface, with the contact portion being designed to be inclined or bent with respect to the axial direction and with respect to the radial direction in relation to an axial lengthwise section. In this case, the inclined or bent contact portion can be formed by ends of variable length bristles of a brush seal. The inclination or bending of the contact portion can also be roughly equal to the inclination or bending of the sealing surface. Especially preferred, the sealing surface and the contact portion have inclinations such that, in the second operating state, a pressure is exerted on the entire sealing element, in particular, if possible, on all bristles of the brush seal, in order to achieve an optimal sealing effect.

The sealing element can be associated with a stator of the turbine and the sealing surface can be associated with a rotor of a turbine. Alternatively, it is also possible for the sealing element to be associated with a rotor of the turbine and for the sealing surface to be associated with a stator of the turbine. The above-described inclinations of the sealing surface and of the contact portion of the sealing element can be designed differently, depending on whether they are provided on the stator side or the rotor side. In particular, in the case of a rotor-side arrangement of the sealing element, it is conceivable that the contact portion is inclined, whereas the stator-side sealing surface is aligned essentially parallel to the machine axis.

Preferably, the sealing element can be formed by bristles of a brush seal. In this case, the bristles in the first operating state can extend essentially in the radial direction with respect to the sealing surface. In the first operating state, the contact portion of the sealing element thus forms a free end, which is not in contact with the sealing surface, but rather forms a boundary of the gap in the radial direction.

The sealing contact between the sealing element and the sealing surface is preferably produced in the second operating state by thermal expansion at the sealing surface or/and at the sealing element or/and by axially and radially acting forces. As already mentioned above, the second operating state represents a running state of the turbine. In a running operation of a turbine, hot gases are formed, which lead to a high operating temperature of the turbine and of the seal arrangement. These high temperatures lead to thermal expansion of components, in particular also of components of the seal arrangement, so that the thermal expansion can be utilized in order to be able to close the gap between the sealing element and the sealing surface and to produce the desired sealing contact in a reliable manner.

The invention further also relates to a turbine, in particular an aircraft gas turbine, with at least one rotor and at least one stator, wherein, for sealing between the rotor and the stator, a seal arrangement with at least one of the above-described features is provided.

BRIEF DESCRIPTION OF THE DRAWING FIGURES

In the following, the invention will be described with reference to the attached figures in an exemplary and non-limiting manner. Directional information, such as "axial" or "axially," "radial" or "radially," and "peripheral", are to be understood fundamentally here as being in relation to the machine axis of the turbine, insofar as something else does not ensue from the context either explicitly or implicitly.

DESCRIPTION OF THE INVENTION

Figure 1A:
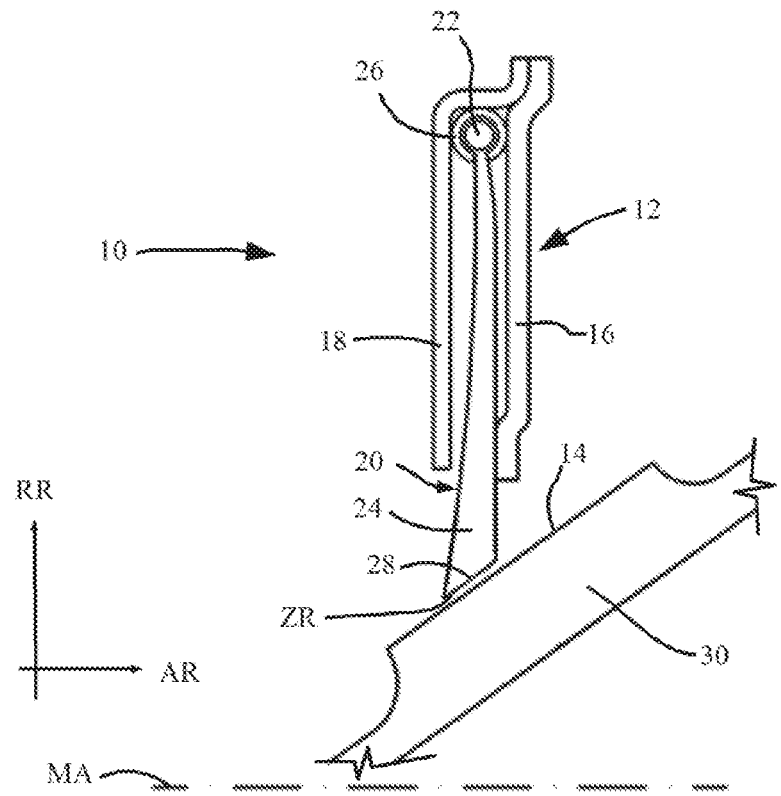
FIGS. 1A and 1B show, in a schematic and simplified manner, a lengthwise sectional illustration of a first embodiment of a seal arrangement.
Figure 1B:
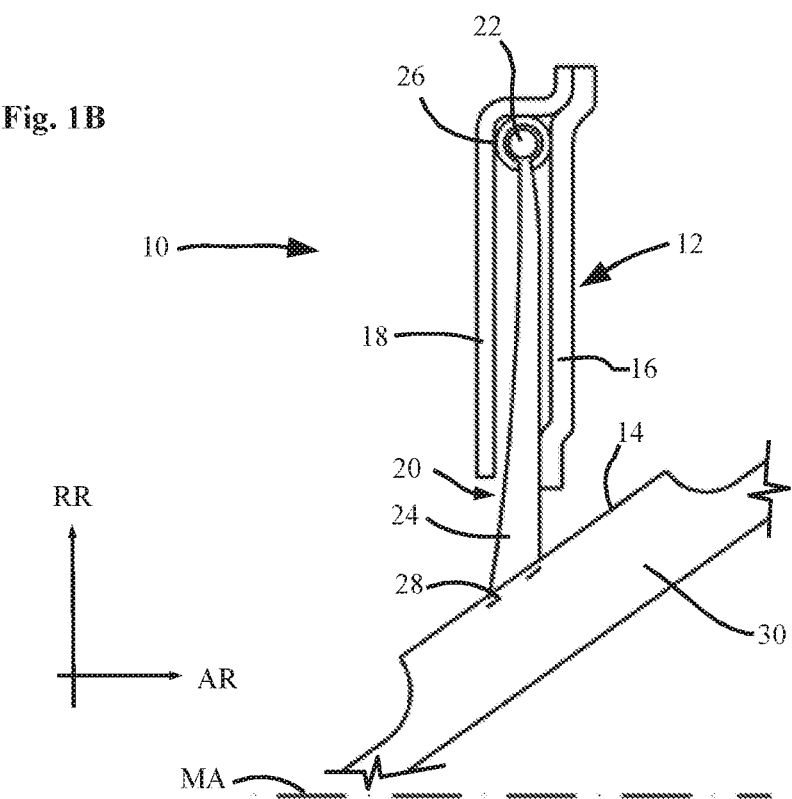

Shown in FIGS. 1A and 1B is a first embodiment of a seal arrangement 10 in a lengthwise section, wherein the sectional plane is spanned by the axial direction AR and the radial direction RR. Also seen and illustrated in a purely schematic manner is a machine axis MA that extends in the axial direction AR.

The seal arrangement 10 comprises a brush seal 12 and a sealing surface 14. The brush seal 12 has a support ring 16, a cover ring 18, and a sealing element 20. The sealing element 20 comprises a core wire 22, a wire or fiber packet 24, and a clamping element 26. The sealing element 20 has radially inside a contact portion 28, which is arranged opposite to the sealing surface 14 in relation to the radial direction. The contact portion 28 is formed, in particular, by the free ends of the wires or fibers of the wire or fiber packet 24.

In the embodiment of FIGS. 1A, 1B, the sealing surface 14 is associated with a rotating component, that is, with a rotor 30 of a turbine, which is not illustrated further. The sealing element 20 is associated with a stationary component, that is, with a stator. Accordingly, the support surface 14 or the rotor 30 rotates relative to the sealing element 20 around the machine axis MA.

The seal arrangement 10 is designed in such a way that, in a first operating state, which is illustrated in FIG. 1A, a gap ZR is formed between the sealing element 20, in particular the contact portion 28 thereof, and the sealing surface 14. This means that, in this first operating state, the wire or fiber packet 24 is not in contact with the sealing surface 14. The contact portion 28 thus forms a free end of the sealing element 20 or of the wire packet 24 in the radial direction RR. The first operating state in this case is preferably a standstill of the turbine. The temperature prevailing in this first operating state in the turbine or in the region of the seal arrangement 10 is below an operating temperature of the turbine, preferably below 100° C., in particular ambient air temperature or room temperature. The first operating state may also be referred to as the cold state. In this state, it is possible, due to the gap ZR for the rotor 30 to be able to move freely relative to the sealing element 20, without it being hindered in doing so by the wire or fiber packet 24. As a result of this, it is also possible to prevent negative impairments of the wire or fiber packet 24.

Illustrated in FIG. 1B is the seal arrangement 10 in a second operating state of the turbine. In this second operating state, the sealing element 20 lies with its contact portion 28 against the sealing surface 14. The sealing element 20 and the sealing surface 14 contact or touch each other. The wire or fiber packet 24 in this case is diverted or bent, particularly in the contact region 28, due to the acting radial compressive forces between the sealing surface 14 and the contact portion 28. In this second operating state, the sealing between the rotor 30 and the stator is produced by the seal arrangement 10. The second operating state is, in particular, a state in which the turbine is running; that is, the rotor 30 rotates around the machine axis. Furthermore, the temperature prevailing in the turbine, particularly in the region of the seal arrangement 10, is an operating temperature that is higher than 100° C., preferably several hundred degrees ° C. The second operating state may also be referred to as a hot operating state.

The temperature difference prevailing between the first (cold) operating state and the second (hot) operating state, optionally in interaction with relative mechanical movements of components with respect to each other, makes it possible for the gap ZR (FIG. 1A) present in the cold operating state to be closed in the hot operating state on account of thermal expansion and, optionally, the relative mechanical movement of stator with respect to rotor, so that a sealing contact is produced between the sealing element 20 and the sealing surface 14 (FIG. 1B). The production and maintenance of the sealing contact in the second operating state can be influenced further by the pressure ratios or flow ratios prevailing in the turbine.

The sealing surface 14 is designed in FIGS. 1A, 1B to be inclined with respect to the axial direction AR and with respect to the radial direction RR. The inclined design of the sealing surface facilitates the production of the sealing contact with the sealing element 20 during thermal expansion in the second operating state. In order for the contact portion 28 to be able to rest optimally against the sealing surface 14 with the free ends of the bristles or fibers of the wire or fiber packet 24, the contact portion 28 also has an inclination at its free end, which corresponds essentially to the inclination of the sealing surface 14. Alternatively to an inclined configuration, the sealing surface 14 and the contact portion 28 can also be configured to be bent or curved. Expressed differently, the sealing surface 14 exhibits an increasing radius in the axial direction AR from left to right. The sealing element 20, starting from the clamping element 26, has bristles or fibers of different length, so that the inclined or oblique contact portion 28 is formed.

Figure 2:
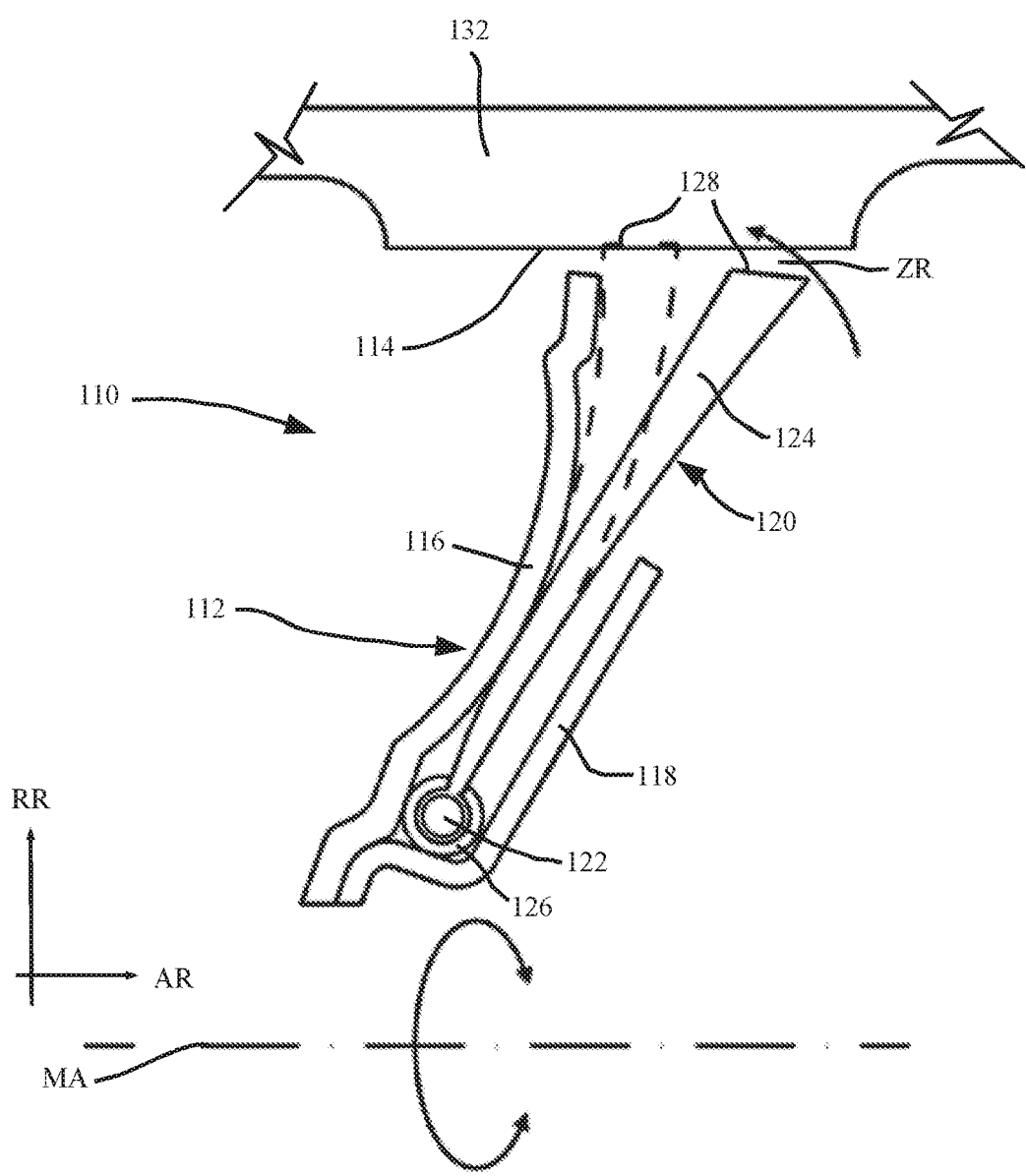
FIG. 2 shows, in a schematic and simplified manner, a lengthwise sectional illustration of a second embodiment of a seal arrangement.

FIG. 2 shows a second embodiment of a seal arrangement 110 illustrated in a lengthwise section, wherein the sectional plane is spanned by the axial direction AR and the radial direction RR. Also evident and illustrated in a purely schematic manner is a machine axis MA extending in the axial direction AR.

The seal arrangement 110 comprises a brush seal 112 and a sealing surface 114. The brush seal 112 has a support ring 116, a cover ring 118, and a sealing element 120. The sealing element 120 comprises a core wire 122, a wire or fiber packet 124, and a clamping element 126. The sealing element 120 has radially outward a contact portion 128, which, in relation to the radial direction RR, is arranged opposite to the sealing surface 114. The contact portion 128 is formed, in particular, by the free ends of the wires or fibers of the wire or fiber packet 124.

In the embodiment of FIG. 2, the sealing surface 114 is associated with a stationary component, that is, with a stator 132, of a turbine, which is not illustrated further. The sealing element 20 is associated with a rotating component, that is, with a rotor. Accordingly, the sealing element 120 rotates relative to the sealing surface 114 around the machine axis MA.

The sealing element 120, illustrated by a solid line, shows the seal arrangement 110 in the first (cold) operating state. The dashed illustration of the sealing element 120 illustrates the second (hot) operating state. What has been stated above in relation to FIGS. 1A and 1B in regard to the two operating states also applies in an analogous manner to the second embodiment in accordance with FIG. 2.

In the first operating state, a gap ZR is formed between the contact portion 128 and the sealing surface 114. In the second operating state (dashed line), the sealing element 120 and the sealing surface are in sealing contact with each other. During the transition from the first to the second operating state, the sealing element 120 is subject to a movement toward the support ring 116, which is illustrated by the curved arrow. This movement toward the support ring 116 occurs particularly due to the acting centrifugal force during rotation of the brush seal 112 around the machine axis. In this embodiment, the sealing contact between the sealing element 120 and the sealing surface 114 is thus produced particularly by a relative mechanical movement between the sealing element 120 and the sealing surface 114, wherein, optionally, a thermal expansion of the sealing element 120 or the entire brush seal 112 in the radial direction can also have an influence.

The contact portion 128 is designed in such a way that, in the first operating state, it is inclined toward the machine axis MA or toward the sealing surface 114. In particular, the inclination is chosen such that the contact portion 128 in the second operating state is aligned essentially parallel to the sealing surface 114, so as to make possible a maximum support against the sealing surface 114 and hence an optimal sealing effect.

When the two embodiments of FIGS. 1A, 1B and 2 are viewed together, the seal arrangement 10 or 110 is thus designed such that, in the first operating state, a gap is formed between the sealing element 20, 120 and the sealing surface 14, 114, whereby this gap ZR is no longer present in the second operating state and the sealing element 20, 120 is in contact with the sealing surface 14, 114.

The embodiments of the sealing element and of the sealing surface illustrated in FIGS. 1A, 1B and 2, in particular the inclination thereof relative to the machine axis or relative to each other, can be chosen in accordance with the design specifications in a turbine. The illustrated inclinations of the sealing surface and of the contact portion can also be inclined, by way of example, more strongly or less strongly. It is also possible for the inclined sealing surface or the inclined contact portion to be bent or curved in design.

All in all, it is achieved by way of the presented seal arrangement that the wire or fiber packet of the brush seal in the resting state (1st operating state) of the turbine does not rest against the sealing surface. Accordingly, in this resting state, the brush seal and the sealing surface can move relative to each other. This facilitates the mounting and the servicing of such a seal arrangement. Furthermore, the risk of damage to the brush seal, in particular to the wire or fiber packet, is reduced or eliminated. Due to the configuration, it is possible in the second operating state to achieve a very good sealing effect nonetheless, because the thermal expansion or/and relative mechanical movement of components with respect to each other, which are present in any case in the turbine during operation, are exploited in order to reliably produce the sealing contact.

What is claimed is:

1. A seal arrangement for a turbine, comprising:
a sealing element and with a sealing surface that interacts with the sealing element, wherein the sealing element and the sealing surface are arranged concentrically with respect to each other, in particular concentrically around a machine axis of the turbine;
wherein the sealing element and the sealing surface are configured and arranged, in a first operating state, a gap is formed between them and that, in a second operating state, a sealing contact is provided between the sealing element and the sealing surface, and
wherein the sealing element is formed by bristles of a brush seal.

2. The seal arrangement according to claim 1, wherein the sealing surface is configured and arranged, in relation to an axial lengthwise section, to be inclined or bent in the axial direction and in the radial direction.

3. The seal arrangement according to claim 1, wherein the sealing element has a contact portion lying opposite to the sealing surface, wherein the contact portion is configured and arranged, in relation to an axial lengthwise section, to be inclined or bent in the axial direction and in the radial direction.

4. The seal arrangement according to claim 3, wherein the inclined or bent contact portion is formed by ends of the bristles which have different lengths.

5. The seal arrangement according to claim 1, wherein the sealing element is associated with a stator of the turbine, and in that the sealing surface is associated with a rotor of the turbine.

6. The seal arrangement according to claim 1, wherein the sealing element is associated with a rotor of the turbine, and in that the sealing surface is associated with a stator of the turbine.

7. The seal arrangement according to claim 1, wherein the first operating state, the bristles extend essentially in the radial direction with respect to the sealing surface.

8. The seal arrangement according to claim 1, wherein, in the second operating state, the sealing contact between the sealing element and the sealing surface is provided by thermal expansion at the sealing surface or/and at the sealing element or/and by axially and radially acting forces.

9. The seal arrangement according to claim 1, wherein the seal arrangement is provided for sealing between a rotor and a stator of an aircraft gas turbine.

* * * * *